United States Patent
Hekmatshoartabari

(10) Patent No.: US 10,901,558 B2
(45) Date of Patent: Jan. 26, 2021

(54) HIGHLY SENSITIVE CAPACITIVE TOUCH WITH RESONANT COUPLING

(71) Applicant: INTERNATIONAL BUSINESS MACHINES CORPORATION, Armonk, NY (US)

(72) Inventor: Bahman Hekmatshoartabari, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/014,408

(22) Filed: Jun. 21, 2018

(65) Prior Publication Data
US 2019/0391681 A1    Dec. 26, 2019

(51) Int. Cl.
G06F 3/044     (2006.01)
G06F 3/0354    (2013.01)
G06F 1/16      (2006.01)

(52) U.S. Cl.
CPC .......... *G06F 3/044* (2013.01); *G06F 1/1643* (2013.01); *G06F 3/03545* (2013.01); *G06F 2203/04112* (2013.01)

(58) Field of Classification Search
CPC . G06F 2203/04103; G06F 2203/04104; G06F 2203/04112; G06F 3/0416; G06F 3/044; G06F 3/03545; G06F 1/1643; G06F 3/0443; G06F 3/0446; G06F 3/046
See application file for complete search history.

(56) References Cited

U.S. PATENT DOCUMENTS

| | | | | |
|---|---|---|---|---|
| 4,648,087 A * | 3/1987 | Scranton | .................. | G01D 5/24 360/110 |
| 9,170,699 B2 * | 10/2015 | Xi | ........................... | G06F 3/046 |
| 9,594,440 B2 * | 3/2017 | Park | ...................... | G06F 3/0416 |
| 9,933,881 B2 * | 4/2018 | Xu | ........................ | G06F 3/0412 |
| 2003/0127704 A1 * | 7/2003 | Kobayashi | ............ | H01L 23/552 257/531 |
| 2005/0206585 A1 * | 9/2005 | Stewart | ................ | G09G 3/2085 345/34 |
| 2009/0256815 A1 * | 10/2009 | Westerinen | ............. | G06F 3/044 345/174 |
| 2011/0248934 A1 * | 10/2011 | Yeh | ........................ | G06F 3/046 345/173 |

(Continued)

FOREIGN PATENT DOCUMENTS

WO    2013069290    5/2013

OTHER PUBLICATIONS

Kim, S., Choi, W., Rim, W. et al. (2011), "A highly sensitive capacitive touch sensor integrated on a thin-film-encapsulated active-matrix OLED for ultrathin displays", IEEE Transactions on electron devices, 58(10), pp. 3609-3615.

(Continued)

*Primary Examiner* — Nitin Patel
*Assistant Examiner* — Amy Onyekaba
(74) *Attorney, Agent, or Firm* — L. Jeffrey Kelly; Otterstedt, Wallace & Kammer, LLP

(57) ABSTRACT

A capacitive touch-sensing device includes a substrate and a plurality of configurable resonant circuits. Each configurable resonant circuit includes at least one respective touch capacitor electrode and at least one inductor. The electrodes of the plurality of resonant circuits are distributed on the substrate, and the at least one inductor is a thin film inductor.

14 Claims, 12 Drawing Sheets

(56) References Cited

U.S. PATENT DOCUMENTS

| | | | |
|---|---|---|---|
| 2012/0127122 A1* | 5/2012 | Lim | G06F 3/0416 345/174 |
| 2012/0162132 A1* | 6/2012 | Chen | G06F 3/044 345/174 |
| 2014/0092056 A1* | 4/2014 | Jhou | G06F 3/044 345/174 |
| 2015/0035793 A1* | 2/2015 | Hirotsune | G06F 3/0416 345/174 |
| 2016/0018940 A1* | 1/2016 | Lo | G06F 3/0416 345/174 |
| 2016/0209957 A1* | 7/2016 | Jung | G06F 3/017 |
| 2017/0117431 A1* | 4/2017 | Afzali-Ardakani | H01L 31/02019 |
| 2017/0371473 A1* | 12/2017 | David | G06F 3/0416 |
| 2019/0147329 A1* | 5/2019 | Hekmatshoartabari | G06N 3/0635 |

OTHER PUBLICATIONS

H.M. Greenhouse, "Design of Planar Rectangular Microelectronic Inductors", IEEE Transactions on parts, hybrids, and packaging, vol. PHP-10, No. 2, Jun. 1974, pp. 101-109.

Seunghoon Ko, et al., "Low noise capacitive sensor for multi-touch mobile handset's applications", IEEE Asian Solid-State Circuits Conference, Nov. 8-10, 2010, Beijing, China, 4 pages.

Ik-Seok Yang, et al. "A touch controller using differential sensing method for on-cell capacitive touch screen panel systems", IEEE Transactions on Consumer Electronics, vol. 57, No. 3, Aug. 2011, p. 1027-1032.

Zhi Ye, et al., "High Precision Active-Matrix Self-Capacitive Touch Panel Based on Fluorinated ZnO Thin-Film Transistor", Journal of Display Technology, vol. 11, No. 1, Jan. 2015, p. 22-29.

Mohamed G. A. Mohamed, et al., "Frequency Selection Concurrent Sensing Technique for High-Performance Touch Screens", Journal of Display Technology, vol. 12, No. 11, Nov. 2016, p. 1433-1443.

Jae-Hun Jun, "In-Cell Self-Capacitive-Type Mobile Touch System and Embedded Readout Circuit in Display Driver IC", Journal of Display Technology, vol. 12, No. 12, Dec. 2016, p. 1613-1622.

J. Craninckx, "A 1.8-GHz CMOS low-phase-noise voltage-controlled oscillator with prescaler", IEEE Journal of Solid-State Circuits, vol. 30 Issue: 12, Dec. 1995, p. 1474-1482.

H. Greenhouse, "Design of Planar Rectangular Microelectronic Inductors", IEEE Transactions on Parts, Hybrids, and Packaging ( vol. 10, Issue: 2, Jun. 1974 ).

F.B.J. Leferink, "Inductance calculations; methods and equations", Proceedings of International Symposium on Electromagnetic Compatibility, Aug. 14-18, 1995, p. 16-22.

* cited by examiner

HIGHLY SENSITIVE CAPACITIVE TOUCH WITH RESONANT COUPLING

BACKGROUND

The present disclosure relates generally to the electrical, electronic, and computer arts, and more particularly, to highly sensitive capacitive touch sensing technology with resonant coupling.

Passive-matrix capacitive-touch is the dominant technology used in cell phones and other portable electronic devices. However, passive touch does not scale to large panels due to capacitive cross-talk between touch cells and passive touch for small panels requires very complex sensing circuitry. Additionally, cross-talk limits resolution, hindering high-resolution applications such as digital drawing with fine tip stylus pens. Active-matrix capacitive-touch uses a selection transistor to isolate the touch cell being sensed and thus reduces cross-talk. However, sensitivity is still limited by the small value of the touch capacitance, the parasitic capacitance, and the resistance added by the selection transistor.

SUMMARY

Techniques are provided for highly sensitive capacitive touch-sensing technology with resonant coupling. In one aspect, an exemplary capacitive touch-sensing device includes a substrate and a plurality of configurable resonant circuits. Each configurable resonant circuit includes at least one respective electrode and at least one inductor. The electrodes of the plurality of resonant circuits are distributed on the substrate, and the at least one inductor is a thin film inductor.

In another aspect, a capacitive touch-sensing device including a plurality of touch sensors including a subset of the touch sensors positioned to form a two-dimensional array having rows of touch sensors in a first direction and columns of touch sensors in a second direction; and a pulse generator for generating short time duration pulses. The pulses are systematically applied to one row of touch sensors after another, applying one pulse per row of touch sensors. Also included are a plurality of thin film transistors. Each thin film transistor is associated with a touch sensor and has a first channel end connected to the touch sensor. The device further includes a column sensing line; a second channel end of the thin film transistor is connected to the column sensing line. The device still further includes a row activating line. A gate of the thin film transistor is connected to the row activating line to transition the thin film transistor to a conducting state during a time when a pulse is impressed on the row activating line and to transition the thin film transistor to a nonconducting state when no pulse is impressed on the row-sensing line. A thin film inductor is connected to the column sensing line by a first lead of the thin film inductor, and an excitation circuit is provided for applying an excitation signal to the column sensing line.

Techniques as disclosed herein can provide substantial beneficial technical effects. By way of example only and without limitation, one or more embodiments may provide one or more of the following advantages:

Enhanced detection sensitivity (particularly beneficial for large panels);

Enhanced resolution (particularly beneficial for stylus use);

Negligible increase in cost, footprint and/or weights, by using monolithically integrated thin-film inductors (i.e., sensitivity/resolution can be enhanced with negligible cost, weight, and size increase).

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 10 is an enlarged section of FIG. 9. Analysis of FIGS. 8-10 reveals that touch sensitivity is reduced as the input capacitance increases, which correlates to touch sensitivity is reduced as the size of the capacitive touch panel size increases;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Subscripts are used to represent elements where more than one such element is present and the subscript is necessary for clarity. Row elements are designated with a subscript "i". Column elements are designated with a subscript "j". An element in an array of elements may be identified by a combination of i and j subscripts. Use of terms row and column could be interchanged and should not be considered limiting. The absence of a subscript for elements that elsewhere have an associated one or two dimensional subscript is a general reference to such elements or there is sufficient clarity which elements are intended without use of a subscript.

As noted, techniques are provided for highly sensitive capacitive touch-sensing technology with resonant coupling. A highly sensitive, active-matrix touch sensor based on resonance coupling between inductors and cell capacitors is provided in one or more embodiments. Inductors may comprise, for example, thin-film inductors fabricated monolithically on the panel side. A touch event causes a downshift in the resonance frequency which is detected by sense circuitry and can be used to identify the location of the touched capacitor electrode. In some embodiments, the sense circuitry may employ a single detection frequency, or a range of frequencies close to the resonance frequency.

Figure 1:
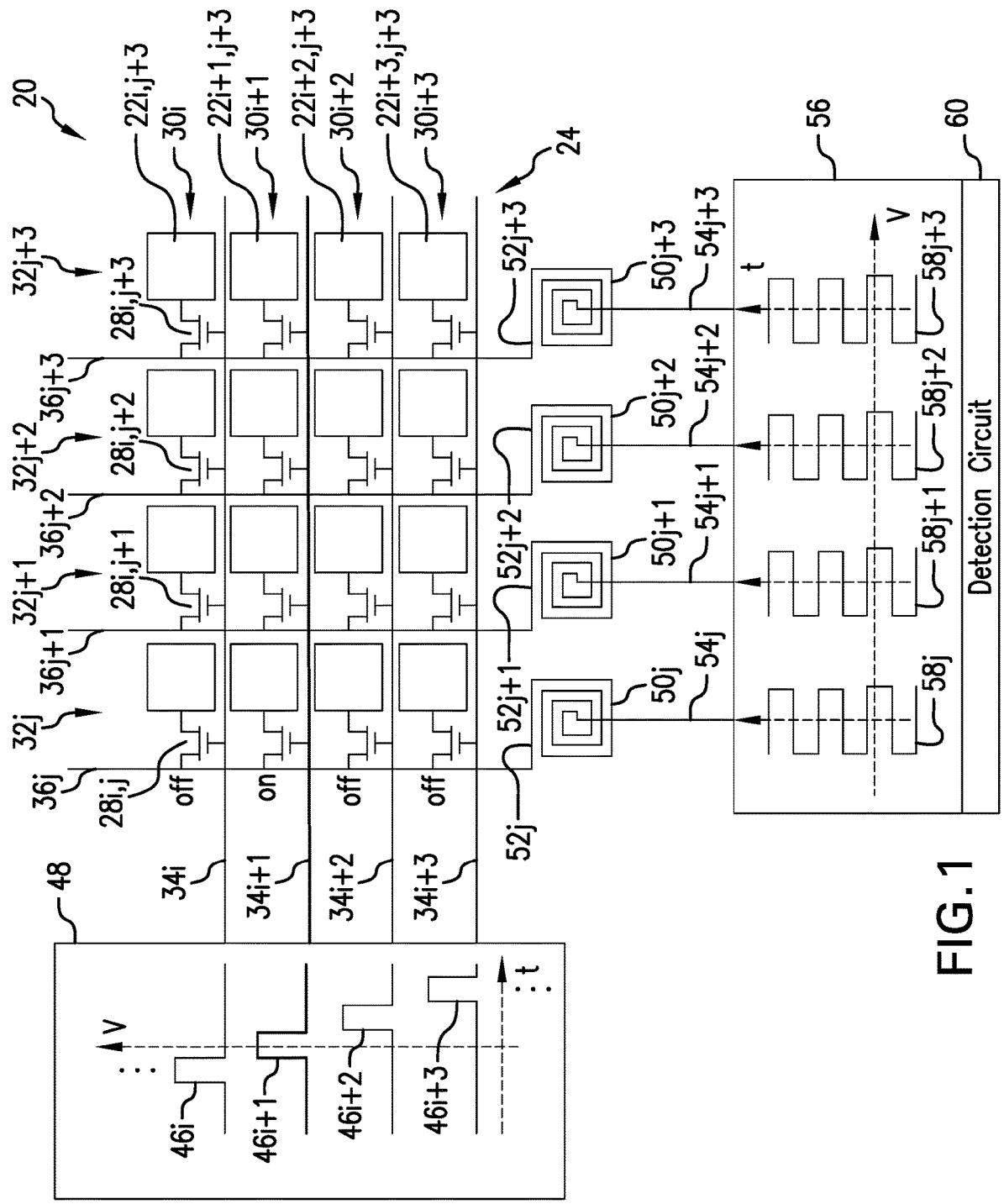
FIG. 1 is a partial schematic diagram depicting an exemplary capacitive touch sensing device.

A first exemplary capacitive touch sensing device 20 is depicted in the partial schematic shown in FIG. 1. A portion of a two-dimensional array 24 (not showing in its entirety) of touch-sensing cells is illustrated. While the portion of a two dimensional array of touch-sensing cells in FIG. 1 is also a two-dimensional array of touch-sensing cells, touch sensing cells can be arranged in other than two dimensional arrays and such arrangements of touch-sensing cells are considered within the scope of this disclosure. Touch capacitors 22 (separately labeled $22_{i,j+3}$, $22_{i+1,j+3}$, $22_{i+2,j+3}$, $22_{i+3,j+3}$) form an arrangement of touch-sensing cells 26 in some embodiments as two dimensional array 24. In addition to a touch capacitor 22, each touch sensing cell 26 (see also FIG. 2) in some embodiments as a two dimensional array 24. In addition to a touch capacitor electrode 22, each touch-sensing cell 26 includes an associated thin film transistor (TFT) 28 (separately labeled $28_j$, $28_{j+1}$, $28_{j+2}$, $28_{j+3}$). In the exemplary touch-sensing device 20, the thin film transistors 28 are n-channel; however, p-channel thin film transistors may be used as well. The touch-sensing cells 26 are formed along rows 30 (separately labeled $30_i$, $30_{i+1}$, $30_{i+2}$, $30_{i+3}$), and columns 32 (separately labeled $32_j$, $32_{j+1}$, $32_{j+2}$, $32_{j+3}$). The use of row and column designations is for convenience of reference to the figures. One skilled in the art would recognize that structures disclosed as columns and rows could be reversed. An array 24 of touch-sensing cells 26 may contain one or more rows of touch-sensing cells 26 and one or more columns of touch-sensing cells 26. The number, M, of touch-sensing cells 26 positioned along rows 30 can be the same as or different from the number, N, of touch-sensing cells 26 positioned along columns 32. The numbers M and N are integers and the number of touch-sensing cells 26 is determined by the application. While a rectangular array of touch-sensing cells 26 will be described, non-rectangular arrangements of touch-sensing cells 26 are within the scope of the disclosure.

Figure 2:
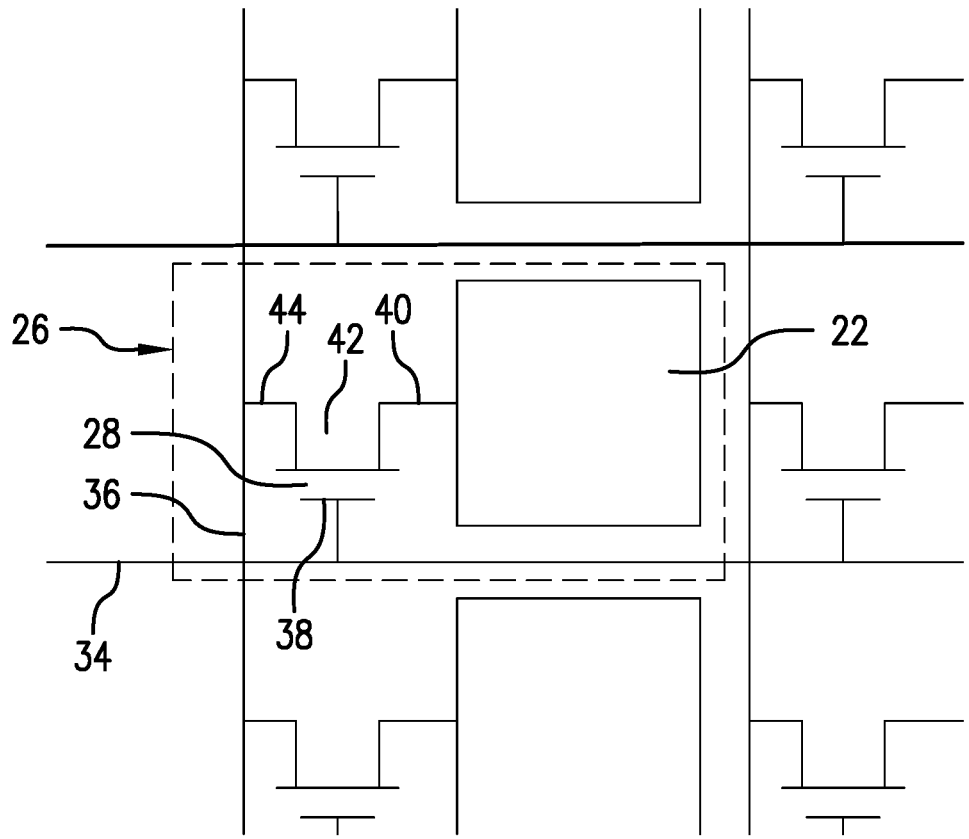
FIG. 2 is a partial schematic diagram depicting an enlarged touch-sensing cell.

As seen in the partial schematic diagram of FIG. 2 depicting an enlarged touch-sensing cell 26, each touch-sensing cell 26 includes a touch capacitor electrode 22, an associated thin film transistor 28, a segment of row activating line 34, and a segment of column sensing line 36 (separately labeled $36_j$, $36_{j+1}$, $36_{j+2}$, $36_{j+3}$). Gate 38 of thin film transistor 28 is connected to the segment of row activating line 34. A first end 40 of channel 42 is connected to the touch capacitor electrode 22. The second end 44 of channel 42 is connected to the segment of column sensing line 36. The thin film transistor 28 is fabricated, for example, on a substrate that has a transparent or translucent transmittance. In some embodiments, the substrate is glass. In other embodiments, the substrate is plastic.

In operation, the capacitive touch sensing device 20 functions in accordance with its intended purpose to identify which touch-sensing cell 26 has been touched. The touching of a touch capacitor electrode is referred to as a touch event. In some embodiments, such as capacitive force-sensing devices, directly or indirectly touching a capacitor electrode further includes applying a force to the capacitor electrode to reversibly deflect or displace the capacitor electrode and thus change its capacitance value. A touch event including force sufficient to deflect or displace the capacitor electrode thereby changing the capacitance value is also known as a "hard" touch.

A scanning voltage pulse is applied to a row activating lines 34. As shown in FIG. 1, a short duration pulse signal is systematically applied to row-sensing lines 34 (separately labeled $34_i$, $34_{i+1}$, $34_{i+2}$, $34_{i+3}$). In some embodiments, applying signal to transition thin film transistors 28 to the on state is achieved by applying a short time duration pulse 46 (separately labeled $46_i$, $46_{i+1}$, $46_{i+2}$, $46_{i+3}$) from pulse generator 48. In embodiments where n-channel transistors are used, a positive-going pulse is illustrated as being applied to row activating lines 34 from the top row $30_i$ to the bottom row $30_{i+3}$. Each thin film transistor 28 having a gate connected to the pulsed sensing line 34 is transitioned from a non-conducting state to a conducting state for the duration of the pulse and subsequent to the pulse the thin film transistor 28 returns to the non-conducting state. One skilled in the microelectronic art would know in embodiments where p-channel thin film transistors are used, negative-going pulses are used to activate lines 34. Since only one row of touch capacitor electrodes 22 are active at a time, capacitive loading from touch-sensing cells 26 in adjacent rows 30 has advantageously been eliminated due to adjacent rows not being simultaneously activated by a pulse 46 from pulse generator 48. In the conducting state, each thin film transistor 28 connects the touch capacitor electrodes 22 to a column sensing line 36 through channel 42, first end 40, and second end 44. As each thin film transistor 28 transitions to a nonconducting state the corresponding touch capacitor electrode 22 is disconnected from the column sensing line 36 to which it was connected.

The row activating lines $34_i$-$34_{i+3}$ may be scanned in real time. Touch capacitor electrodes 22 can be touched sequentially to enter a sequence of letters, numbers, characters, or other information. In multi-touch devices, more than one touch capacitor electrode 22 may be touched at a time. Once a row 30 has been scanned, the pulse generator 48 advances to the next row 30 to be scanned and applies a pulse to evaluate touch capacitor electrodes 22 in that row for a touch event. This process is repeated until all of the row activating lines have been scanned. At the end of each scan, the row and column number (s) of the touched cell (s), if any, are determined. In single-touch devices, row scanning may be terminated once a touch event is detected in a row. After all rows 30 are scanned, the pulse generator 48 begins to scan the rows 30 again until detecting a touch event is no longer needed, such as when the scanning is terminated and the touch-sensing device 20 is turned off.

The row scanning and pulse generation are achieved in pulse generator 48 by a circuit, software, or a combination of both, using techniques known in the art. The pulse duration may be in the range of 1 to 100 micro-seconds, but shorter or longer pulses may also be used in some embodiments. The rows 30 are scanned in a repeatable sequence. In some embodiments, the row sensing line 34 are scanned sequentially. An embodiment of sequential scanning of row activating lines 34 is illustrated in FIG. 1, where the rows of sensing lines 34 are scanned from the upper row 34, to the bottom row $34_{i+3}$. Other embodiments of scanning row activating lines 34 are possible and are within the scope of the disclosure. In some embodiments, the order of scanning row activating lines 34 can be achieved using hashing techniques to potentially locate a touch event more quickly. Any order of scanning the rows of sensing lines 34 is included within the scope of the disclosure.

The active-matrix capacitive-touch panel is fabricated on a substrate, which is placed on a display panel. The capacitive touch-sensing device achieves high resolution by controlling each capacitive electrode 22 by an associated thin film transistor 28. The thin film transistor is controllably switched from a non-conducting state to conducting state, as well as from a conducting state to a non-conducting state. The process steps to fabricate the active-matrix capacitive-touch circuits have been developed to require temperatures that do not exceed 200° C., including fabricating the thin film transistors 28. The low fabrication temperatures allow the use of thin, lightweight and/or flexible substrates, such as plastic or flexible glass, in some embodiments. Furthermore, the thin film transistors 28 have high transmittance and/or small areas, thus optically blocking correspondingly small areas, which is appropriate in some embodiments due to the capacitive-touch panel being positioned between a display panel and the user. In one example, the thin film transistor channel is made of thin (e.g., ≤50 nm) silicon, which has high transmittance. In another example, the thin film transistor has a channel dimension (width×length) or ≤5 μm×5 μm. The row lines and column lines may be formed using a transparent conductive material such as indium-tin-oxide. In some embodiments, the thin film transistors 28 are heterojunction filed-effect transistors including hydrogenated amorphous silicon gate and hydrogenated crystalline silicon source/drain regions on thin film crystalline silicon substrates. The thin-film crystalline silicon substrates may be made of low-temperature poly-silicon prepared by excimer laser annealing of amorphous silicon, and may have a thickness in the range of 30-50 nm. The heterojunction filed-effect transistors may be fabricated at temperatures that do not exceed 200° C. The heterojunction field-effect transistors may have a channel dimension (width×length) of smaller than 5 μm×5 μm. In one example, the heterojunction filed-effect transistors have a channel dimension of 2 μm×2 μm.

The column sensing lines $36_j$ are connected to a respective inductor 50 (separately labeled $50_j$, $50_{j+1}$, $50_{j+2}$, $50_{j+3}$). The inductors 50 are sized to have an inductance magnitude that is resonant with, or near resonance with, the parasitic capacitance in the circuit (discussed below) and, the capacitance of the touch capacitor electrodes 22 that, through the respective thin film transistor 28, are coupled to the same column sensing line 36. Each of the touch capacitor electrodes 22 in a column 32 of touch capacitor electrodes are individually resonant or near resonance with the inductor 50 connected to the same column sensing line 36. In some embodiments, the inductors 50 are fabricated as thin film spiral inductors which may have a small parasitic capacitance with a negligible effect. The calculation of inductance values for resonance or near resonance and the layout of monolithic inductors to achieve a desired inductance are well known to those in the art of microelectronics. For instance, a thin-film rectangular inductor made of non-magnetic materials, having a line width of 2 microns, line-to-line distance (pitch) of 2 microns and an area of 1 millimeter square (and therefore approximately 63 turns) is estimated to have an inductance value in the range of 5 to 25 microhenries. The parasitic resistance of inductor $50_j$ through $50_{j+3}$ has negligible effect unless the resistance of the inductor 50 is of a comparable magnitude to the on-resistance of the thin film transistor 28 connected to the same column sensing line 36 to which the inductor 50 is connected.

Figure 4:
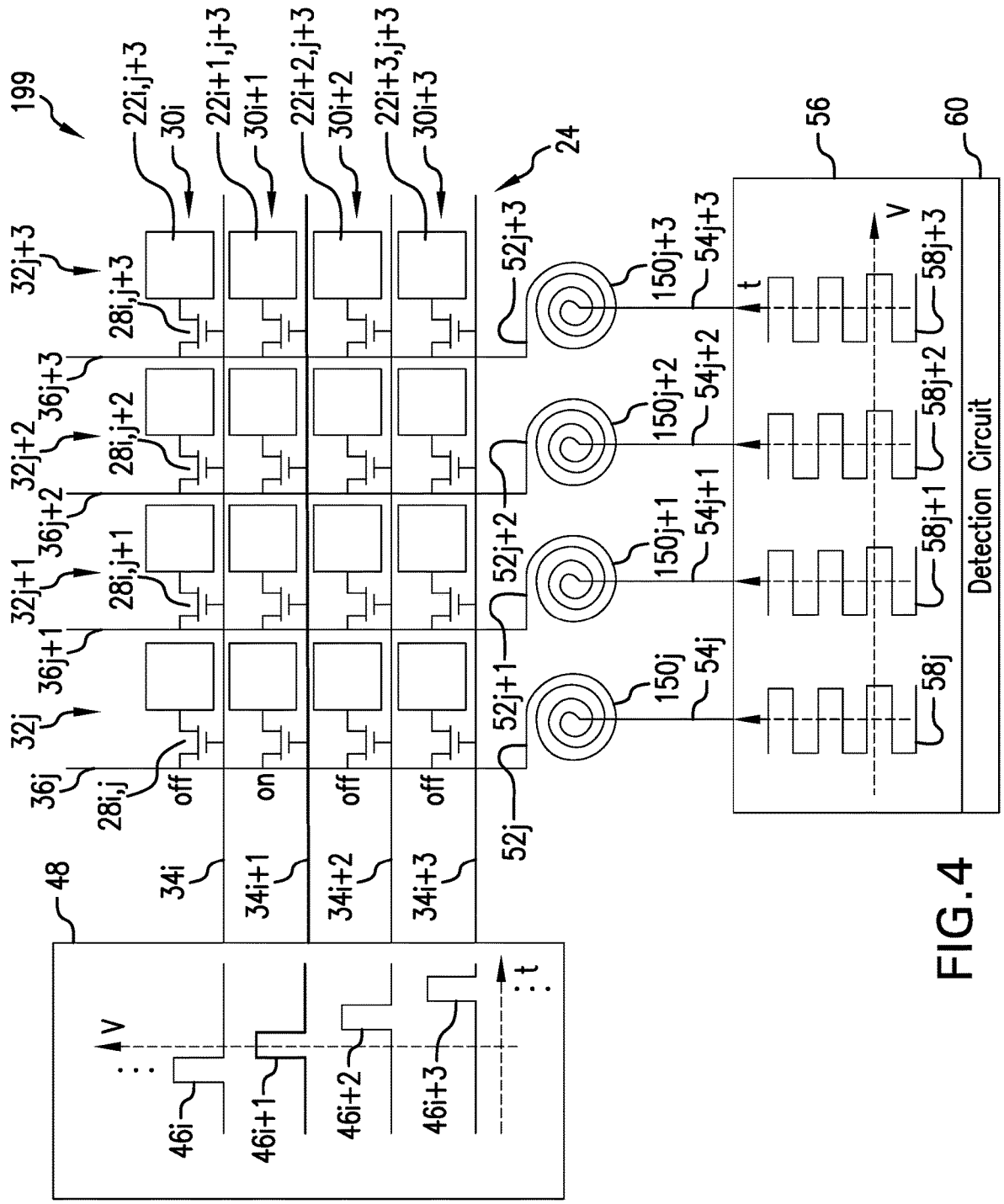
FIG. 4 is an embodiment of a partial schematic diagram depicting an exemplary capacitive touch-sensing device with circular shaped thin film inductors.

In some embodiments, the inductors 50 may form a square spiral as shown in FIG. 1. In other embodiments, the inductors 150 (separately labeled $150_j$, $150_{j+1}$, $150_{j+2}$, $150_{j+3}$) may form a circular spiral as shown in FIG. 4, an octagonal spiral, a hexagonal spiral, or any other shape that provides the desired inductance that is resonant with, or near, resonance with the parasitic capacitance in the circuit and the capacitance of the touch capacitor electrodes 22 in the same column 32 as the inductor 50. The inductance to achieve resonance coupling or near resonance coupling with touch capacitor electrodes 22 in the same column 32 as the inductor 50 can be determined empirically, analytically or numerically. Note the embodiment illustrated in FIG. 4 is similar to that of FIG. 1 except for the inductor shape, and similar elements have received similar reference characters.

Each column sensing line 36 through $36_{j+3}$ is connected to a first lead 52 to $52_{j+3}$ of a corresponding thin film inductor $50_j$ to $50_{j+3}$. The thin film inductors 50 are fabricated on the same side of the substrate as the thin film transistors 28. The second lead 54 to $54_{j+3}$ of each corresponding inductor $50_j$ to $50_{j+3}$ is coupled to a corresponding excitation circuit for applying an excitation signal to the column sensing line 36 to $36_{j+3}$. Excitation signals $58_j$, $58_{j+1}$, $58_{j+2}$, and $58_{j+3}$ are oscillating signals, in some embodiments in the radio frequency range, generated by excitation and detection circuit 56 and impressed on the second inductor lead $54_j$ through $54_{j+3}$ of respective thin film inductors $50_j$, $50_{j+1}$, $50_{j+2}$ and $50_{j+3}$, thereby coupling the respective excitation signals $58_j$ to $58_{j+3}$ to corresponding column sensing lines $36_j$ to $36_{j+3}$. The detection circuit 60 within the excitation and detection circuit 56 detects whether a touch event occurs in the row 30 of touch capacitors 22 in which the short duration pulse 46 has transitioned the thin film transistors 28 to the conducting state. The excitation signals $58_j$ to $58_{j+3}$ may be voltage signals, as illustrated for the exemplary detection circuit 60 of FIG. 1, applied by a voltage signal generator (voltage source) within the detection circuit 60. The current drawn from the voltage source during the application of the excitation signals $58_j$ to $58_{j+3}$ may be measured by the detecting circuit 60 to detect resonance. The ratio of the amplitude of a given excitation voltage signal to the amplitude the current drawn from the voltage supply during the application of the excitation voltage signal corresponds to the input impedance seen by the voltage supply and may be used to detect resonance. In other embodiments, the excitation signals $58_j$ to $58_{j+3}$ may be current signals applied by a current signal generator (current source) and the voltage drawn across the current source may be measured for detecting resonance. Similarly, the ratio of the amplitude of a given excitation current signal to the amplitude of the voltage drawn across the current source during the application of that excitation current signal corresponds to the input admittance (inverse of input impedance) seen by the current supply and may be used for detecting resonance. Detection circuit 60 detects a change in the input impedance (or admittance), from the change of the amplitude of the current (or voltage) drawn from the voltage (or current) supply for a given frequency and amplitude of excitation signal 58, resulting from a touch event. The touch capacitor electrode 22 at the row 30 and column 32 intersection of the pulsed row 30 and the column sensing line 36 on which a change from the expected amplitude is detected identifies the touch capacitor electrode (e.g. $22_{i+1,\ J+2}$) at which a touch event occurred. In some embodiments, the excitation signal may include a single frequency (i.e., a sine wave) close to the resonance frequency corresponding to a touched capacitor electrode (touch resonance) or the resonance frequency corresponding to an untouched capacitor electrode (non-touch resonance). Since impedance (or admittance) varies rapidly versus frequency in the vicinity of resonance frequency, choosing the excitation frequency close to the resonance frequency may substantially enhance the detection sensitivity.

In other embodiments, the excitation signal may comprise a range of frequencies encompassing the resonance frequency. In such embodiments, the detection circuit 60 may determine the resonance frequency by finding the approximate local maximum or minimum of the impedance or admittance versus frequency, and depending on whether the determined resonance frequency is associated with a touched or an untouched capacitor electrode, determine whether a touch event has or has not occurred with respect to a given touch electrode. It will be appreciated that detecting impedance (or admittance) change or determining the resonance frequency are not limited to the methods discussed above as other techniques known in the art may also be used. In addition, the excitation signal may not be oscillatory. In one such example, the excitation signal may comprise a single pulse and the time response arising from the pulse may be analyzed by the detection circuit. In some embodiments, the detection circuit may include an analog-to-digital converter and a digital processor.

Figure 3:
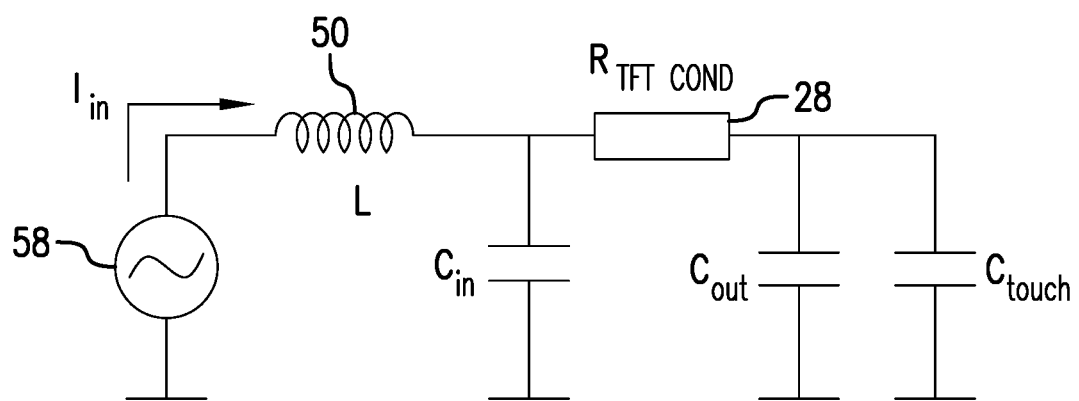
FIG. 3 is a schematic diagram depicting an exemplary equivalent circuit at the time of a touch event in FIG. 1.

An exemplary equivalent circuit is shown in FIG. 3. The equivalent circuit represents the detection of a touch event on one of the touch capacitors electrodes 22 in the row $30_{i+1}$ as described above with respect to FIG. 1. Excitation voltage signals $58_j$ to $58_{j+3}$ (generally, 58) are generated as illustrated by a voltage source and impressed through respective thin film inductors $50_j$ to $50_{j+3}$ (generally, 50) onto column sensing lines $36_j$ to $36_{j+3}$. The current drawn from the voltage source, $i_{in,j}$ to $i_{in,j+3}$, (generally, $i_{in}$) is the input current to the equivalent circuit. The capacitance is shown lumped into an input capacitance, $C_{in}$, an output capacitance, $C_{out}$, and the capacitance between a touch capacitor electrode and a stylus or person's finger due to a touch event, $C_{touch}$. (Note when the touch electrode is not touched, $C_{touch}=0$ or it has a very small parasitic capacitance value). The resistance of the thin film transistor 28, is shown as $R_{TFT\ COND}$. (The subscript COND indicates the thin-film transistor is in its conductive or ON state). The input capacitance $C_{in}$ and output capacitance $C_{out}$ can be evaluated as follows:

$$C_{in} = \tfrac{1}{2}(W\,L\,C_{gate}) + n\,WC_{ov} + nC_x$$

$$C_{out} = \tfrac{1}{2}(W\,L\,C_{gate}) + WC_{ov}$$

Where: W is the width of the thin film transistor channel;
L is the length of the thin film transistor channel;
$C_{gate}$ is the thin film transistor gate capacitance;
n is the number of rows in two-dimensional array 24;
$C_{ov}$ is the thin film transistor overlap capacitance; and
$C_x$ is line crossing capacitance.

The calculation of capacitances from overlapping microelectronic structures and overlapping circuit conductors is well known to those of skill in the art of microelectronics. The thin film transistor 28 adds parasitic capacitance to each touch-sensing cell 26 and parasitic resistance to the detection line. The overlap capacitance is due to the source/drain overlapping the gate along the length of the source/drain. The area in which the source and drain overlap the gate determines the overlap capacitance. The parasitic overlap capacitance is independent of the channel length. Each of the capacitances in the equations above can be calculated to develop $C_{in}$ and $C_{out}$. The touch capacitance, $C_{touch}$, can be calculated based on the area of the touch capacitor electrode 22 or determined empirically.

Each column sensing line 36 is coupled to a respective inductor 50. Inductors fabricated on semiconductor substrates such as silicon and operating in the radio frequency range suffer from capacitive and magnetic losses, due to coupling with the semiconductor substrate. However, when thin-film inductors are fabricated on glass or plastic, the only major loss in the inductor 50 is the resistive loss. Since the resistance of the thin film transistor 28 in the conductive state is the dominant contribution to resistance, the resistance of the inductor 50 provides only a small contribution to the circuit resistance and may be considered negligible.

Figure 5:
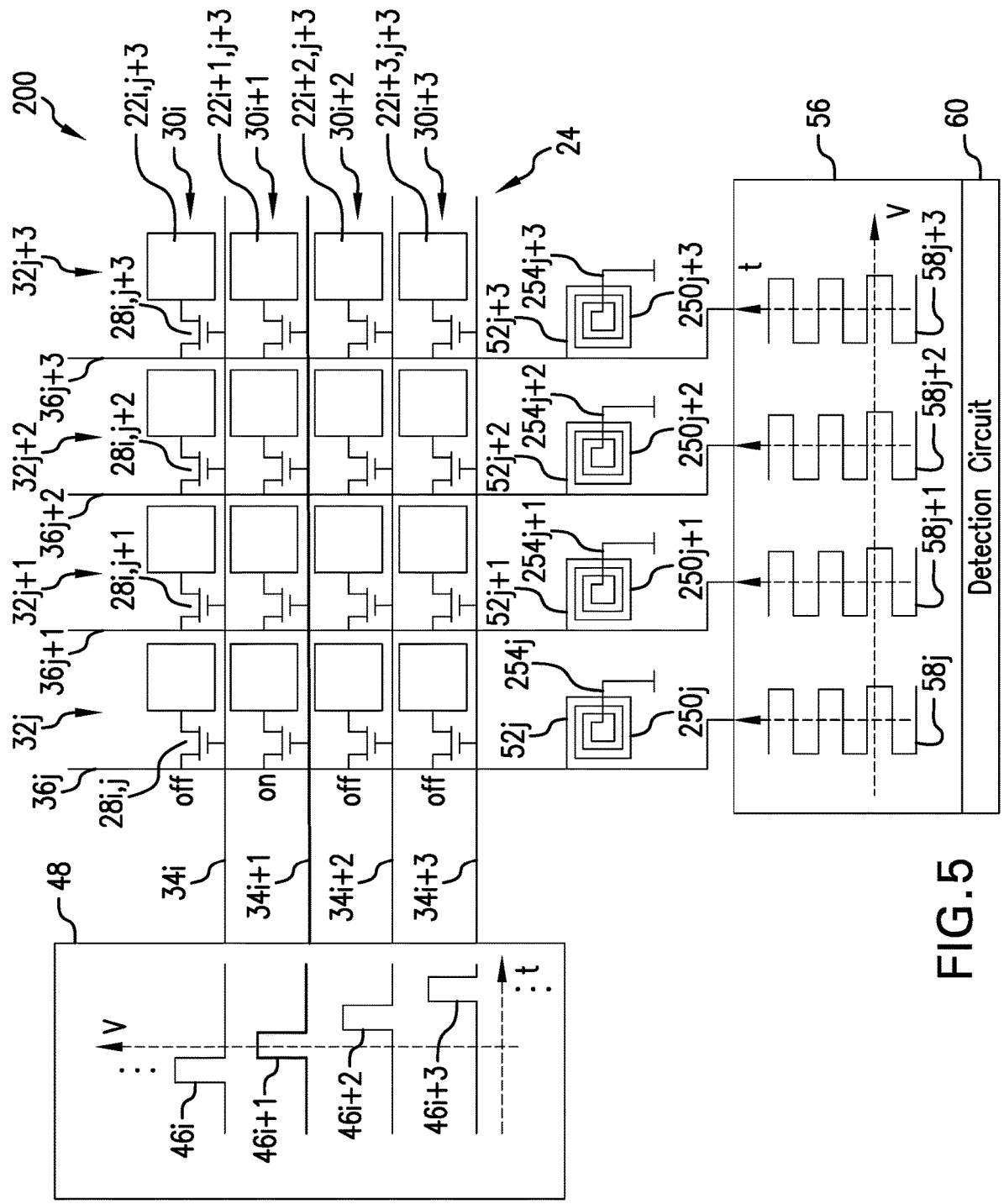
FIG. 5 is an embodiment a partial schematic diagram depicting another exemplary capacitive touch sensing device.

In some embodiments, such as circuit 200 in FIG. 5, inductors 250 are connected in parallel. Elements in FIG. 5 similar to those in FIG. 1 have received the same reference character. The second lead $254_j$ to $254_{j+3}$ of each corresponding inductor $250_j$ to $250_{j+3}$ is grounded. FIG. 5, like FIG. 1, illustrates pulse generator 48 generating a pulse $46_{i+1}$ that is being applied to row activating line $34_{i+1}$. Pulse $46_{i+1}$ has transitioned the thin film transistors $28_{i+1,\ j}$; $28_{i+1,\ j+1}$; $28_{i+1,\ j+2}$; and $28_{i+1,\ j+3}$ to the conducting state activating touch capacitor electrodes $22_{i+1,j}$; $22_{i+1,j+1}$; $22_{i+1,j+2}$; and $22_{i+1,j+3}$. While FIG. 5 shows thin-film inductors 250 that form spiral squares, some embodiments have inductors that form other shapes including circular spiral, octagonal spiral, hexagonal spiral, or any other shape that provides the desired inductance for resonance coupling with a respective touch capacitor electrode 22 and parasitic capacitance.

Figure 6:
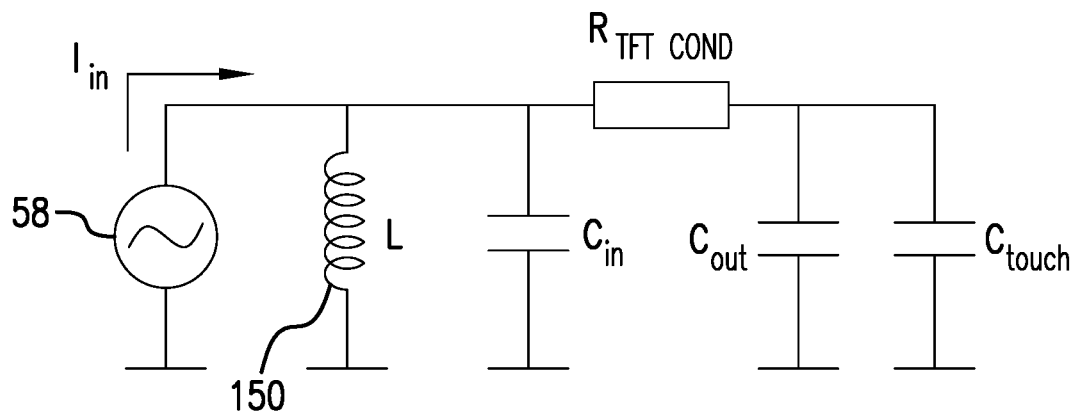
FIG. 6 is a schematic diagram depicting an exemplary equivalent circuit at the time of a touch event in FIG. 5.

FIG. 6 is an exemplary embodiment of an equivalent circuit of a touch-sensing cell 26 being touched in FIG. 5, with the row activating line $34_{i+1}$ asserted. Thin film inductors 250 are parallel with the excitation signal 58, the input capacitance, $C_{in}$, the output capacitance $C_{out}$, and the touch capacitance, $C_{touch}$. The first inductor leads $52_j$ to $52_{j+3}$ are connected to a corresponding column sensing line $36_j$ to $36_{j+3}$. The second inductor leads $254_j$ to $254_{j+3}$ are connected to a ground potential. The excitation and detection circuit 56 generates excitation signals $58_j$ to $58_{j+3}$ as radio frequency signals, which are impressed on corresponding column sensing line $36_j$ to $36_{j+3}$.

Figure 7:
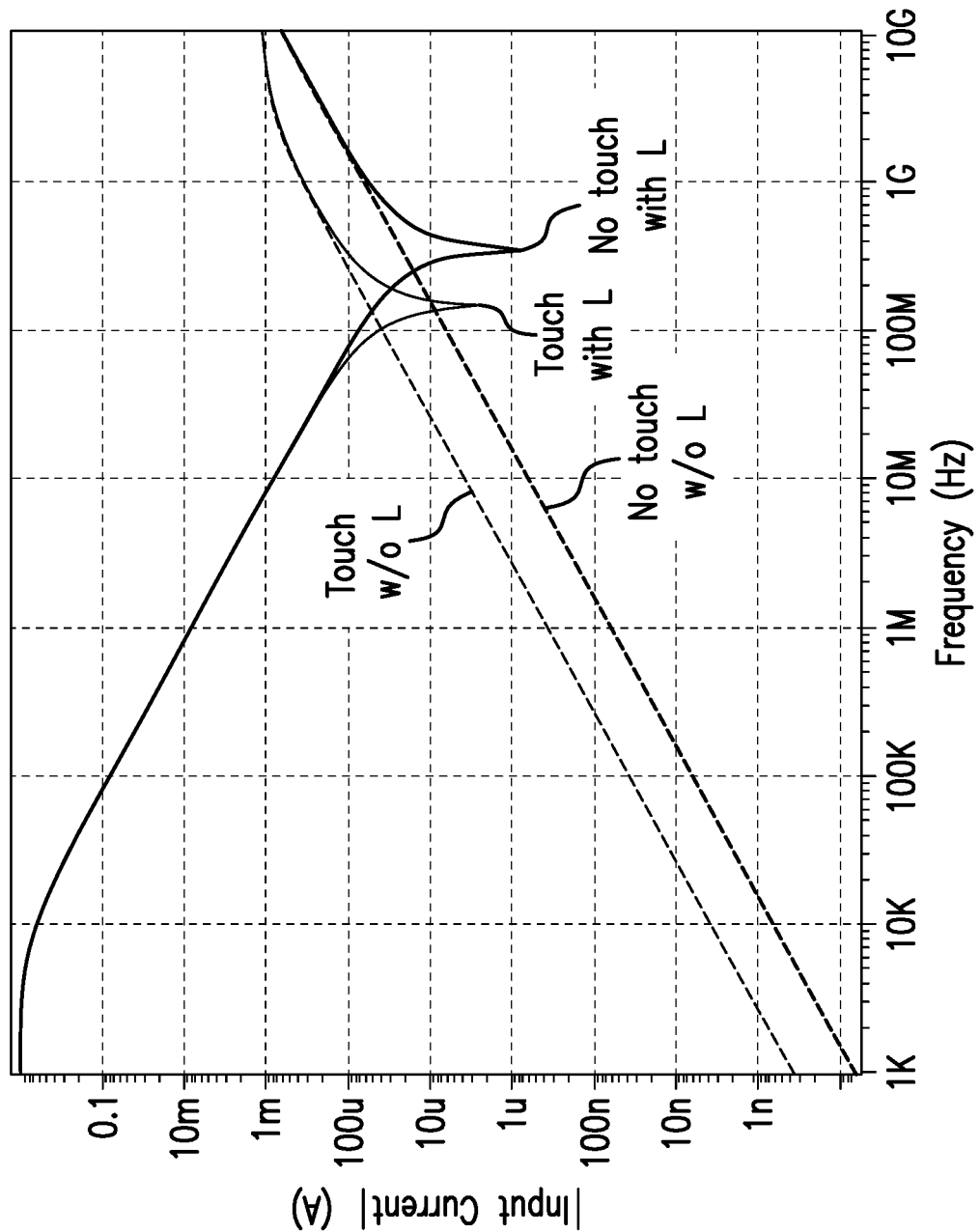
FIG. 7 is a graph showing a parallel inductor creates a resonant zero.

Due to the parallel inductors in the embodiment illustrated in FIG. 5 in operation, a resonant zero is created as illustrated in FIG. 7. Although the resonant zero may be more difficult to detect, the embodiment illustrated in FIG. 7 detects the resonant zero as part of the process of identifying the touch capacitor electrode 22 that has experienced a touch event with improved sensitivity over the prior art.

Figure 8:
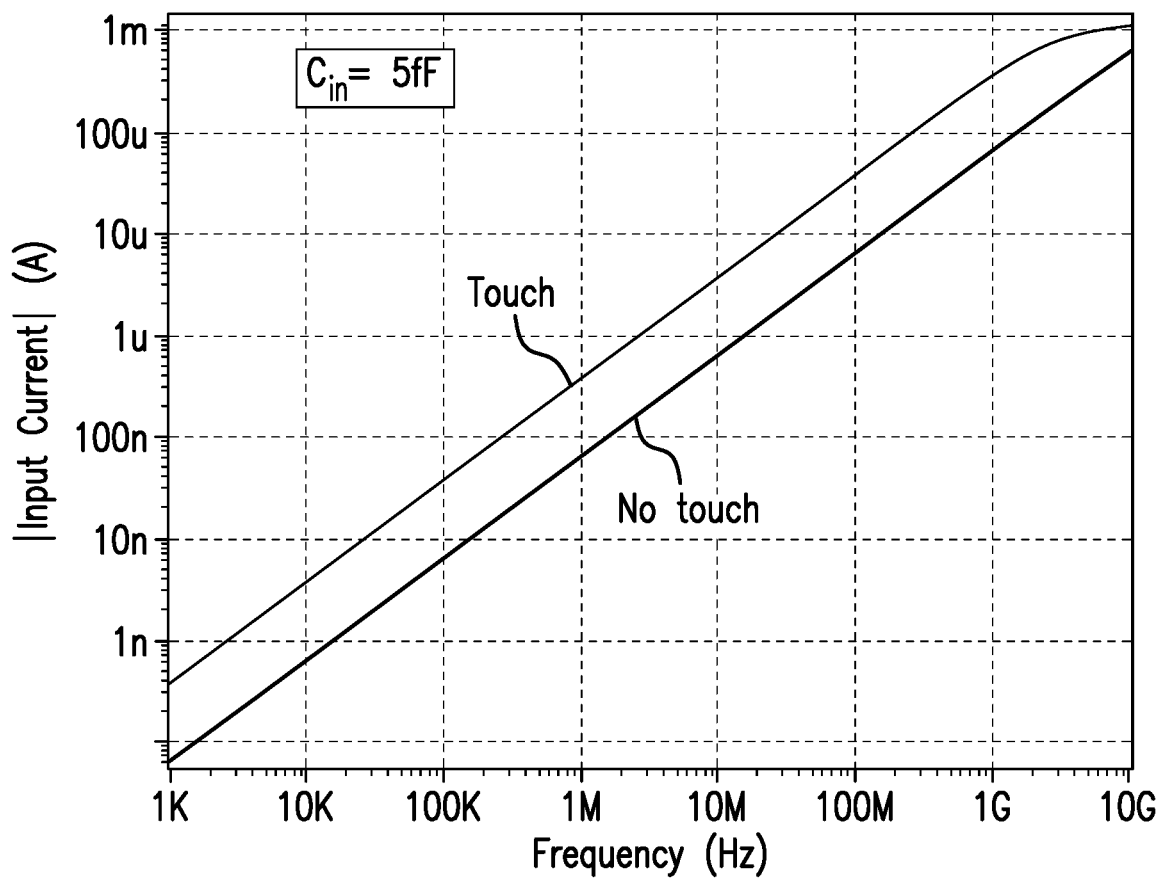
FIGS. 8-10 are graphs showing simulation results of the impact of panel size on touch sensitively.
Figure 9:
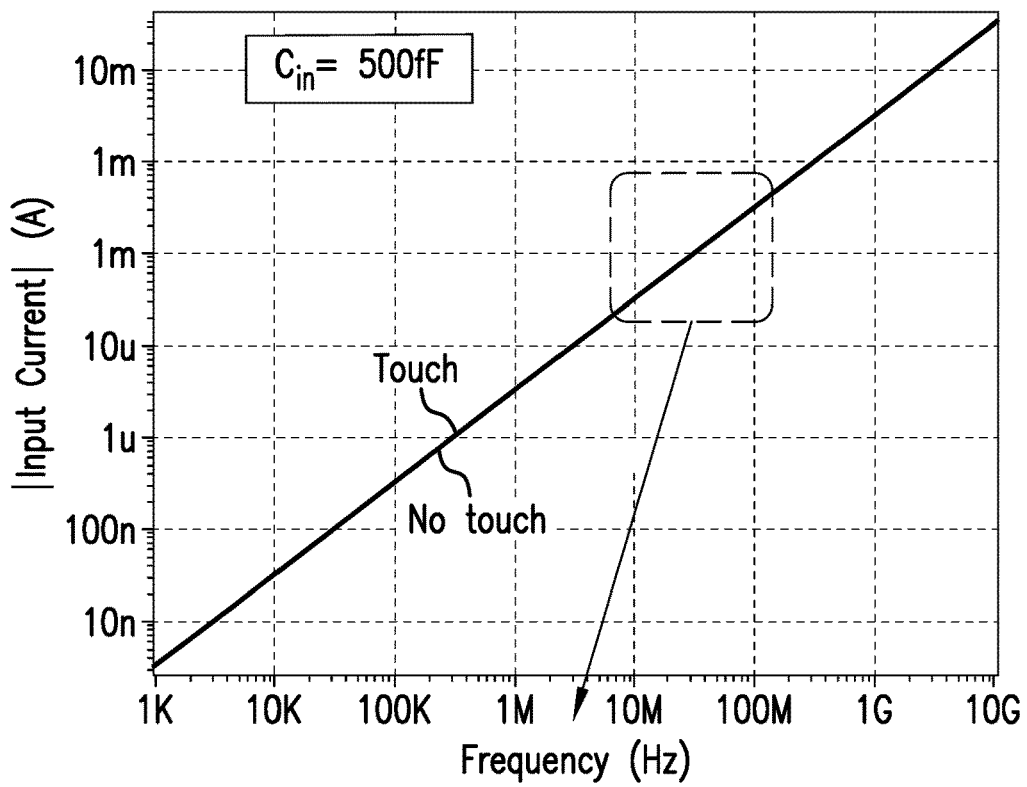
Figure 10:
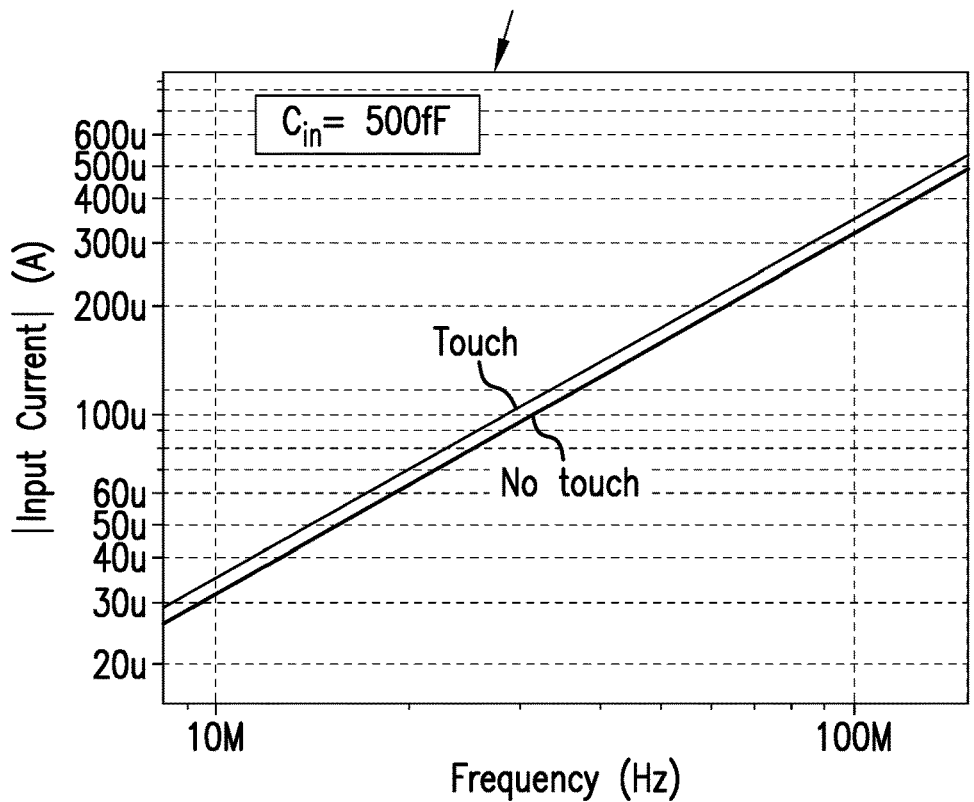
Figure 11:
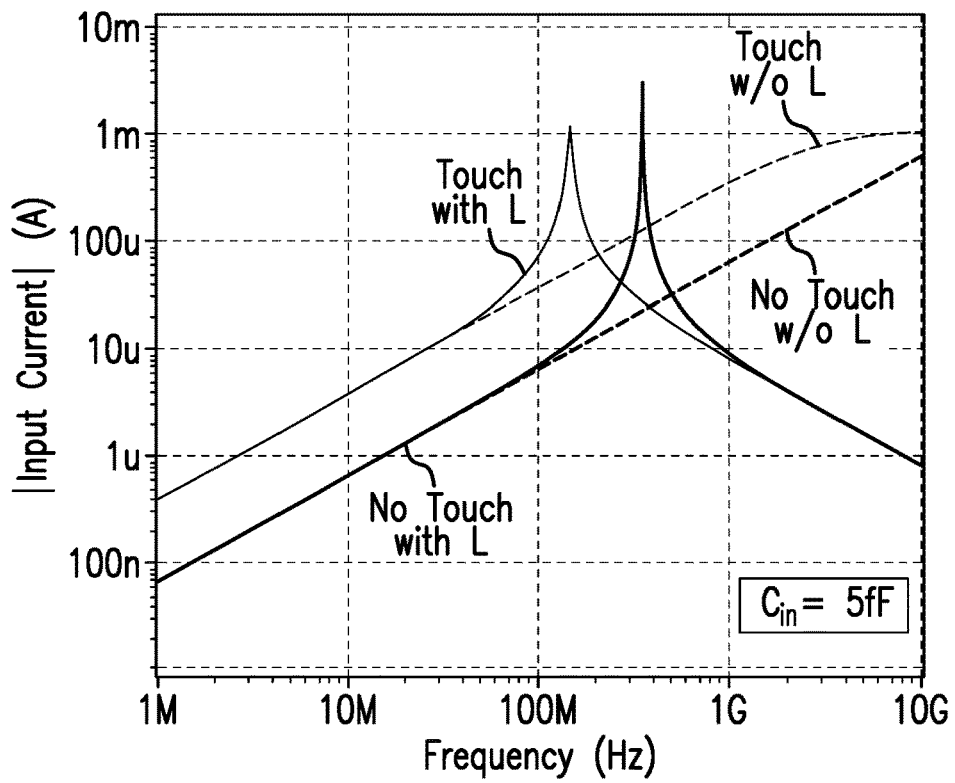
FIGS. 11-14 are graphs showing a touch event can be detected by detecting the touch event resonance or the departure from the non-touch excitation resonance.
Figure 12:
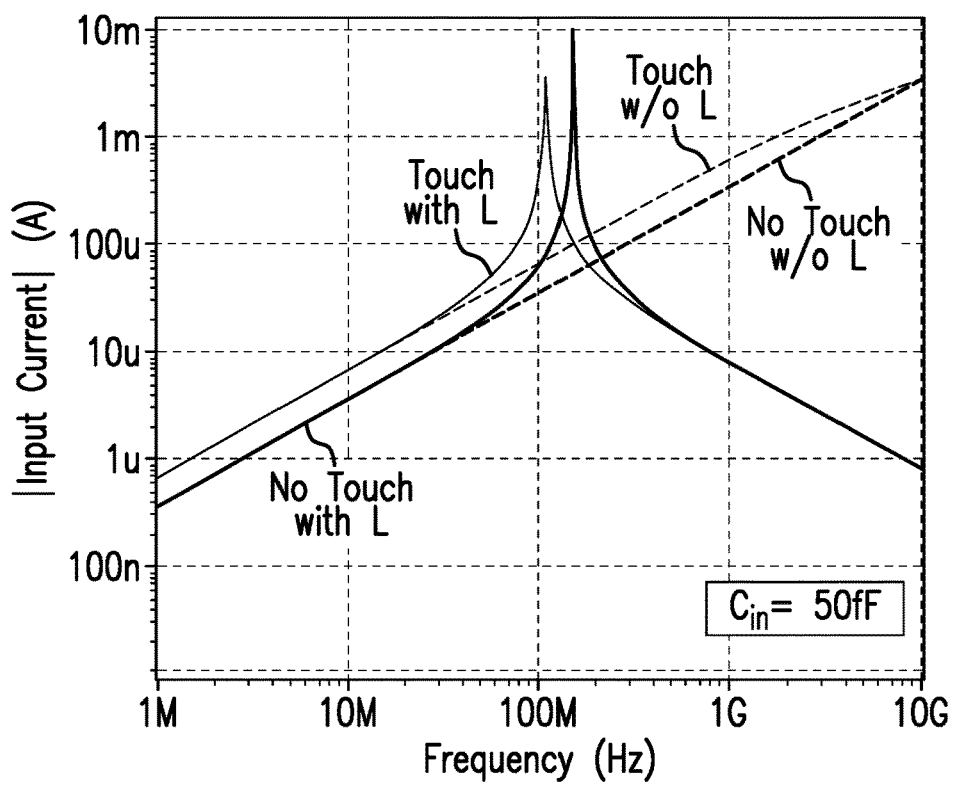
Figure 13:
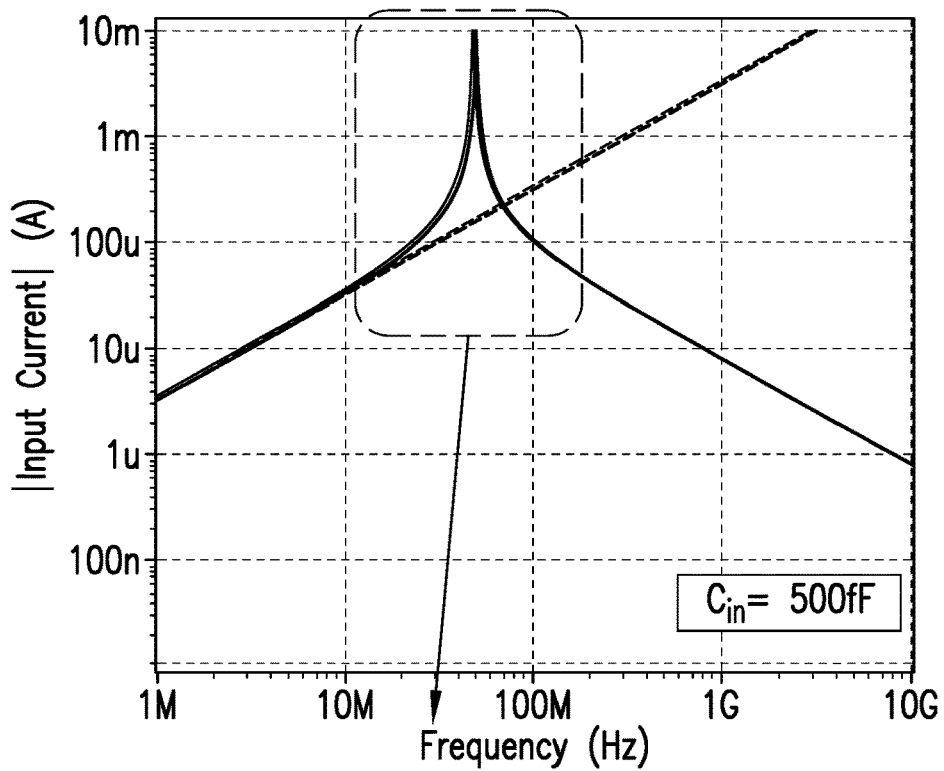
Figure 14:
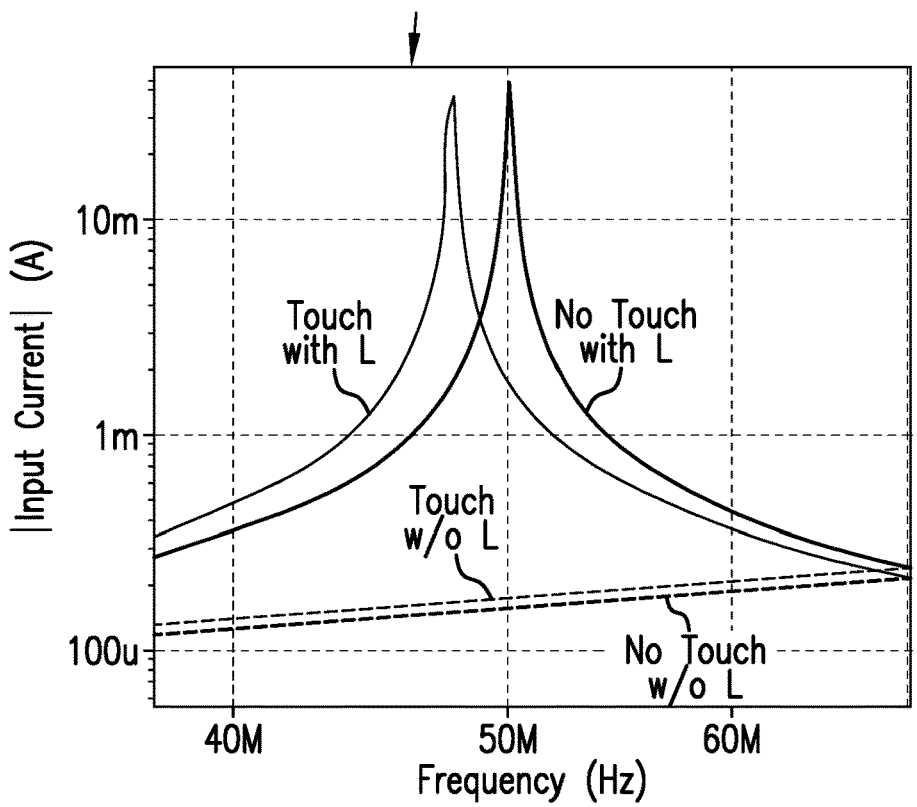

FIGS. 8-10 are results of a simulation to evaluate the impact the capacitive touch panel size has on sensitivity, for prior art touch panels. Simulations were conducted using the equivalent circuit illustrated in FIG. 3 with L=0, i.e. prior art panel without inductors. The resistance, $R_{TFT\ COND}$, of the film transistor 28 in the conducting state was simulated as 1 kilohm. The output capacitance, $C_{out}$, was simulated as 5 femtofarads. The amplitude of the oscillating excitation signal 58 was one volt. The touch capacitance, $C_{touch}$, was simulated as 0.2 femtofarads representing no touch, and a touch event was represented as 50 femtofarads. The input capacitance $C_{in}$, for a small panel was simulated as 5 femtofarads and for a large panel was simulated as 500 femtofarads. The graphs in FIGS. 8-10 have amplitude of input current, $|I_{in}|$, on the vertical axis and frequency of the excitation signal 58 on the horizontal axis. In FIG. 8, representing a small capacitive touch sensing panel, $I_{in}$ ranged from 0.1 nanoamp to 1 milliamp. Excitation signal 58 ranged in frequency from 1 kilohertz to 10 gigahertz. In FIG. 9, representing a large capacitive touch sensing panel, current ranged from 0.1 nanoamp to 10 milliamps. Excitation signal 58 ranged in frequency from 1 kilohertz to 10 gigahertz. FIG. 10 shows details of the region in FIG. 9 outlined in a dashed line. As observed, increasing the panel size reduces the difference between the touch and no-touch currents and thus degrades the detection sensitivity.

FIGS. 11-14 are results of a simulation to evaluate how resonance coupling enhances sensitivity. Simulations were conducted using the equivalent circuit illustrated in FIG. 3. The simulation results from the prior art panel (without inductor) described above are also plotted for comparison. The resistance, $R_{TFT\_COND}$, of the film transistor 28 in the conducting state was simulated as 1 kilohm. The magnitude of the oscillating excitation signal 58 was one volt. The touch capacitance, $C_{touch}$, was simulated as 0.2 femtofarads representing no touch and a touch event was represented as 50 femtofarads. The input capacitance and output capacitance were based on equations set forth above. The graphs in FIGS. 11-14 have input current amplitude, on the vertical axis and frequency of the excitation signal 58 on the horizontal axis. Analysis of FIGS. 11-14 reveals that resonance coupling enhances detection sensitivity and is particularly beneficial for large panels. For example, referring to FIG. 12, using an excitation frequency of approximately 100 MHz (i.e. the touch resonance frequency) for detection, results in input current amplitudes below 100 micro-amps and few milliamps for a touch event and lack thereof, respectively; well over an order of magnitude difference. Similarly, using an excitation frequency of approximately 140 MHz (i.e. the no-touch resonance frequency) for detection, results in well over an order of magnitude difference in the input current amplitudes. In contrast, for a prior-art touch sensor (without inductor) the difference is only about a factor of two. Furthermore, in some embodiments, the detector circuit may measure the input current over a range of frequencies and determine the resonance frequency by finding the maximum amplitude. For example, referring again to FIG. 12, if the resonance frequency is found to be close to 100 MHz or 140 MHz a touch event or lack thereof is detected, respectively. In contrast, this approach is not possible in the prior art touch cell since the input current amplitude does not have a local maximum versus frequency.

Figure 15:
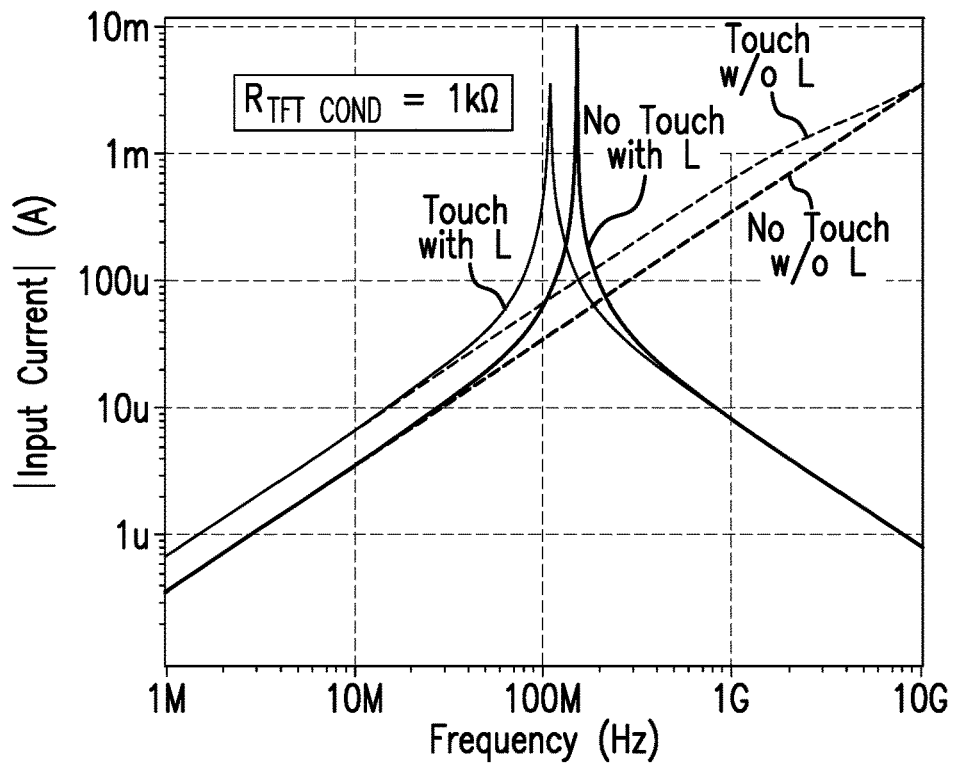
FIGS. 15-16 are graphs showing increased on-resistance of a thin film transistor reduces the peak current at resonance and therefore, reduces touch detection sensitivity but does not alter the resonance frequency.
Figure 16:
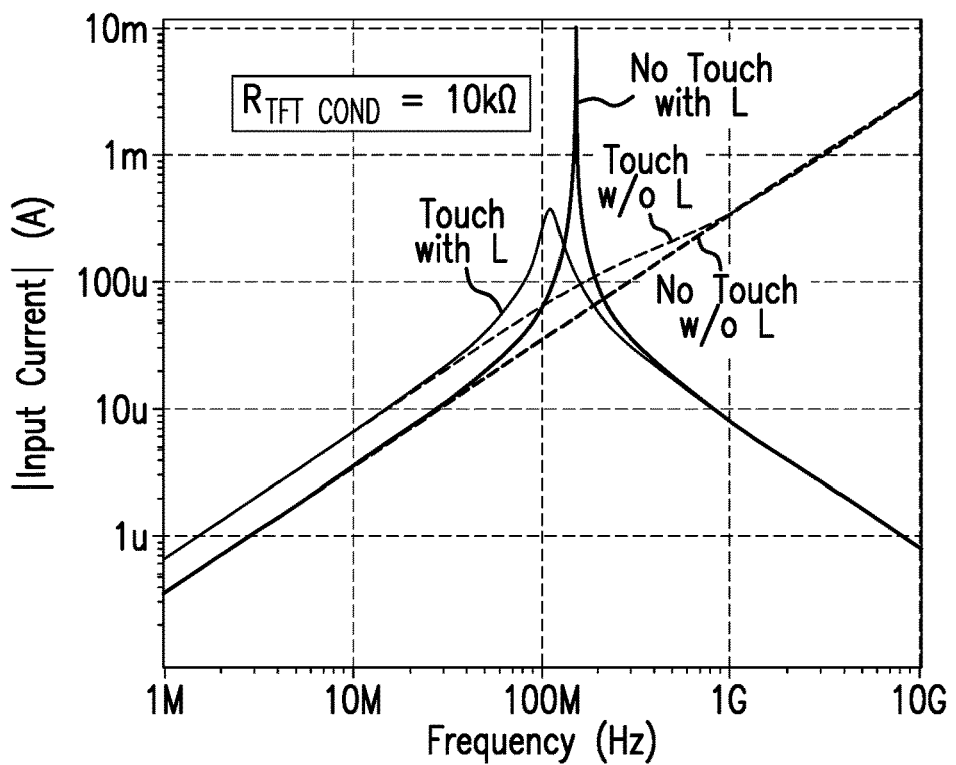
Figure 17:
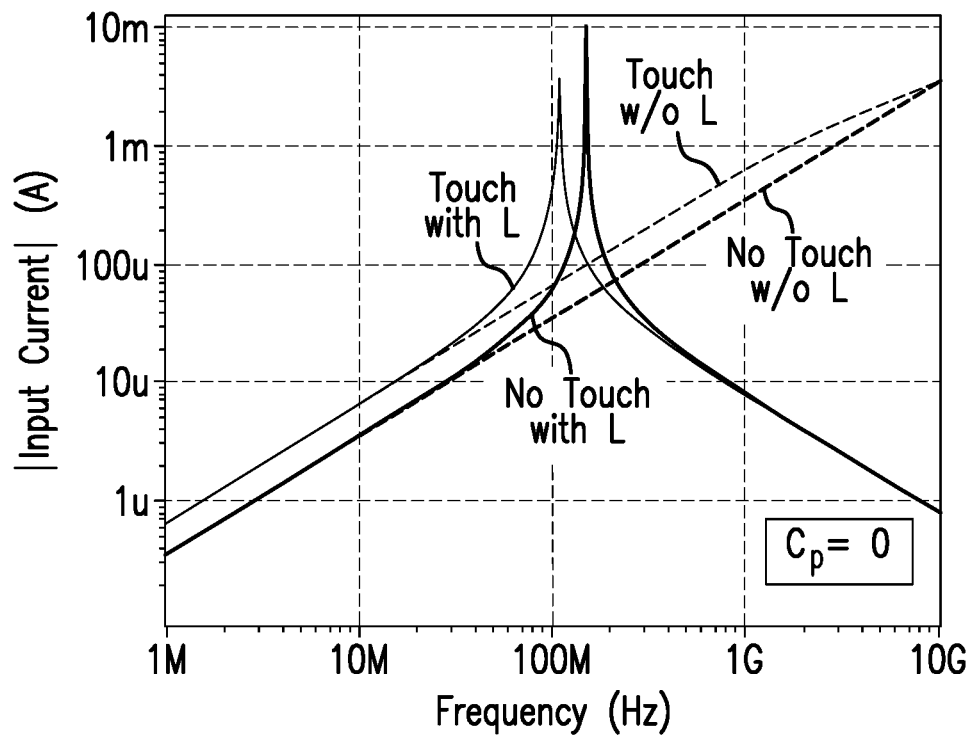
FIGS. 17-20 are graphs showing the parasitic capacitance of an inductor creates a resonance zero in the transfer characteristics.
Figure 18:
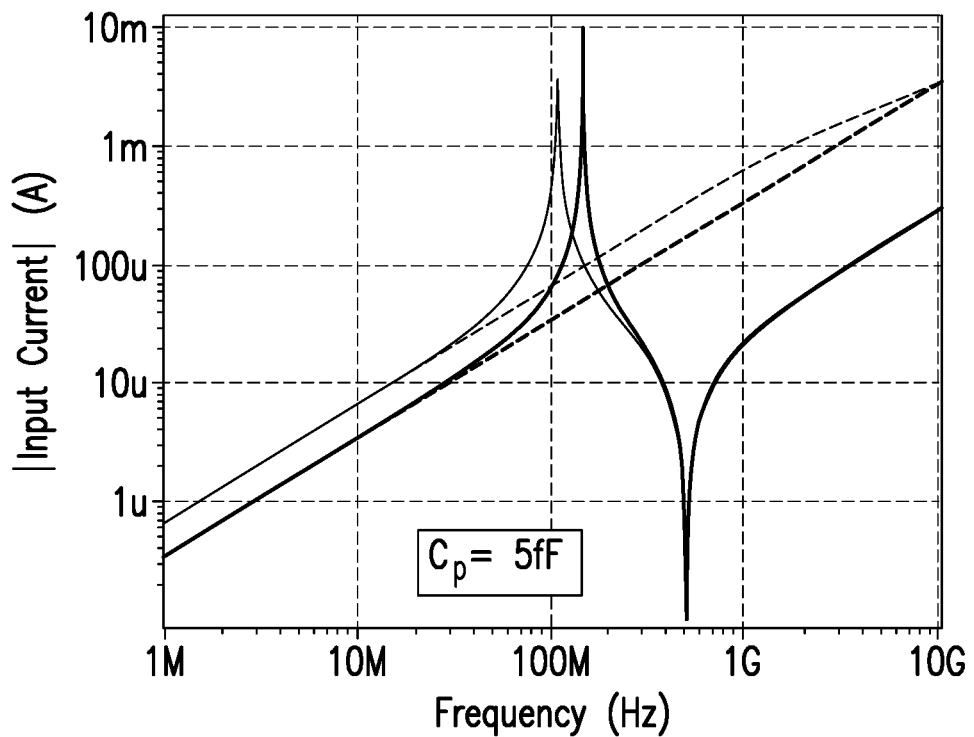
Figure 19:
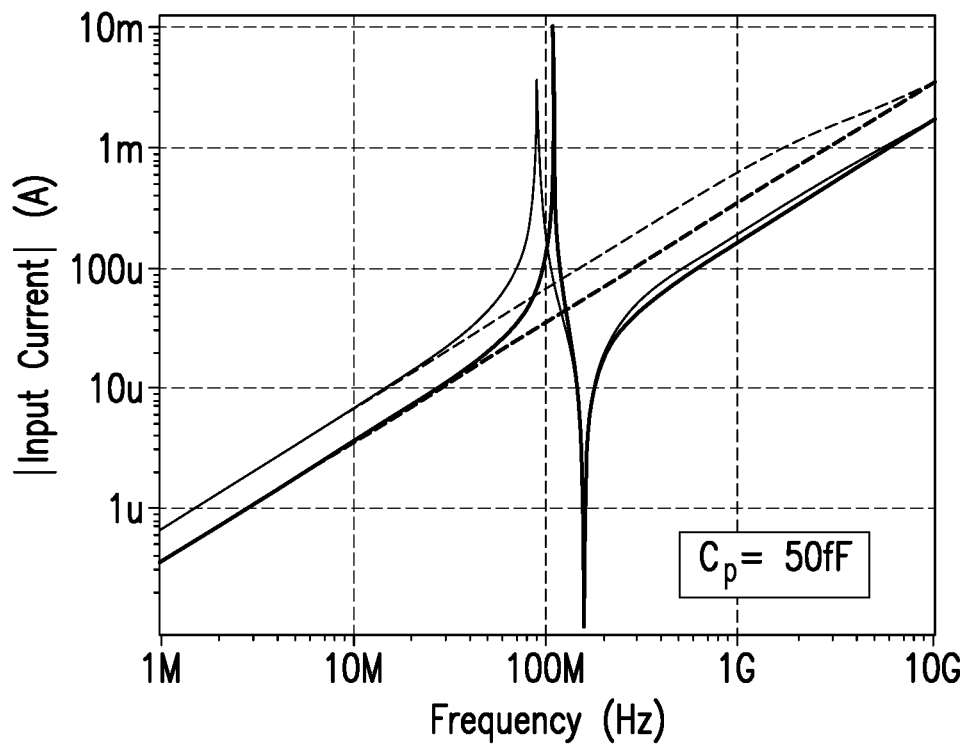
Figure 20:
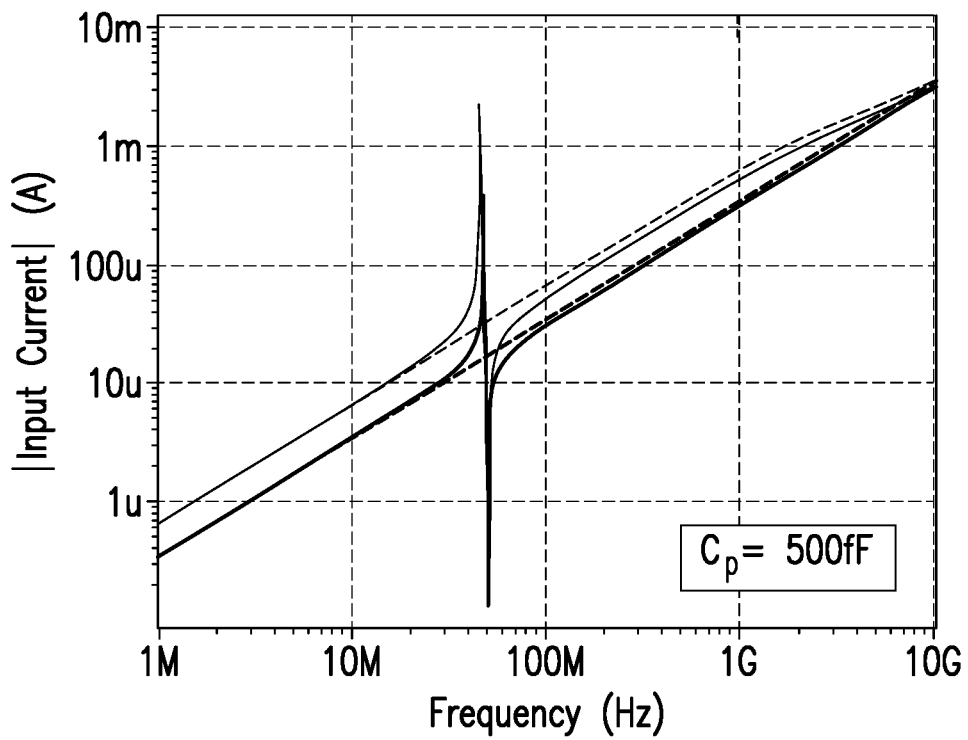

FIGS. 15 and 16 are results of a simulation to evaluate the impact of the resistance of a thin film transistor 28 in the conducting state on detection sensitivity. Simulations were conducted using the equivalent circuit illustrated in FIG. 3. The input capacitance was simulated as 50 femtofarads. The output capacitance was simulated as 5 femtofarads. The magnitude of the oscillating excitation signal 58 was one volt. The touch capacitance, $C_{touch}$, was simulated as 0.2 femtofarads representing no touch, and a touch event was represented as 50 femtofarads. The inductance was simulated as 10 microhenries. FIGS. 15 and 16 reveal that increased resistance of a thin film transistor in the conducting state reduces the peak current amplitude at resonance, and concomitantly reduces detection sensitivity; however, the increased resistance does not alter the resonance frequency. In this exemplary simulation, the peak current amplitude at touch resonance is adversely affected by increasing the transistor resistance. However, the no-touch resonance frequency is not affected and single-frequency detection with excitation frequency close to the non-touch frequency may be used with high sensitivity. In addition, since neither of the resonance frequencies are affected, multiple-frequency detection to identify the resonance frequencies (by identifying the local maximum of $|I_{in}|$) may also be performed with high sensitivity.

FIGS. 17-20 are results of a simulation to evaluate the impact of inductor parasitic capacitance size has on detection sensitivity. Simulations were conducted using the equivalent circuit illustrated in FIG. 3, with the inductor parasitic capacitance simulated by a capacitor $C_p$ in parallel with the inductor. Simulations were conducted for $C_p$ of 0, 5, 50, and 500 femtofarads in FIGS. 17-20 respectively. The resistance, $R_{TFT\_COND}$, of the film transistor 28 in the conducting state was simulated as 1 kilohm. The output capacitance, $C_{out}$, was simulated as 5 femtofarads. The magnitude of the oscillating excitation signal 58 was one volt. The touch capacitance, $C_{touch}$, was simulated as 0.2 femtofarads representing no touch, and a touch event was represented as 50 femtofarads. The input capacitance $C_{in}$, was simulated as 500 femtofarads. The inductance was simulated as 10 microhenries. The graphs in FIGS. 17-20 have the amplitude of input current, $|I_{in}|$, on the vertical axis and frequency of the excitation signal 58 on the horizontal axis. Analysis of FIGS. 17-20 reveals that the parasitic capacitance of the inductor creates a resonance zero in the transfer characteristics. Furthermore, unless the inductor parasitic capacitance is very large (about 500 femtofarads in this simulation example), which is not expected for thin-film inductors, the parasitic resonance frequency is higher than the resonance frequencies and does not impact touch detection.

It is to be appreciated that the features shown in the accompanying figures may not be drawn to scale. Furthermore, one or more semiconductor layers of a type commonly used in such integrated circuit devices may not be explicitly shown in a given figure for ease of explanation. This does not imply that the semiconductor layer(s) not explicitly shown are omitted in the actual integrated circuit device.

At least a portion the various layers and/or regions shown in the accompanying figures may not be drawn to scale. Furthermore, one or more semiconductor layers of a type commonly used in such integrated circuit devices may not be explicitly shown in a given figure for ease of explanation. This does not imply that the semiconductor layer(s) not explicitly shown are omitted in the actual integrated circuit device.

Those skilled in the art will appreciate that the exemplary structures discussed above can be distributed in raw form (i.e., a single wafer having multiple unpackaged chips), as bare dies, in packaged form, or incorporated as parts of intermediate products or end products.

A capacitive touch-sensitive device in accordance with aspects of the present disclosure can be employed in essentially any application and/or electronic system. Given the teachings of the present disclosure provided herein, one of ordinary skill in the art will be able to contemplate other implementations and applications of embodiments disclosed herein.

The illustrations of embodiments described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. It should also be noted that, in some alternative implementations, some of the steps of the exemplary methods may occur out of the order noted in the figures. For example, two steps shown in succession may, in fact, be executed substantially concurrently, or certain steps may sometimes be executed in the reverse order, depending upon the functionality involved. The drawings are also merely representational and are not drawn to scale. Accordingly, the specification and drawings are to be regarded in an illustrative rather than a restrictive sense.

Embodiments are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A capacitive touch-sensing device, comprising: a substrate; a plurality of configurable resonant circuits, each configurable resonant circuit comprising at least one respective touch capacitor electrode and at least one inductor, the touch capacitor electrodes of the plurality of resonant circuits being distributed on the substrate, the at least one inductor being a thin film inductor; and an excitation circuit, wherein at least a subset of the at least one respective touch capacitor electrode comprises an array of electrodes; wherein the array of electrodes is an M row by N column array of electrodes, both M and N being integers; and wherein the excitation circuit is configured to apply a single-frequency excitation signal to at least the plurality of configurable resonant circuits in at least one of a given one of said M rows and a given one of said N columns.

2. The capacitive touch-sensing device of claim 1, wherein the thin film inductor is fabricated on the substrate.

3. The capacitive touch-sensing device of claim 1, wherein configuration of the thin film inductor with the at least one respective touch capacitor electrode is selected from the group consisting of being in series and being in parallel.

4. The capacitive touch-sensing device of claim 1, wherein M and N are different integers.

5. The capacitive touch-sensing device of claim 1, wherein M and N are the same integer.

6. The capacitive touch-sensing device of claim 1, further comprising a high transmittance substrate.

7. The capacitive touch-sensing device of claim 6, wherein the substrate transmittance is selected from the group consisting of transparent and translucent.

8. The capacitive touch-sensing device of claim 6, wherein the substrate is transparent and is made from a material selected from the group consisting of glass, silicon and plastic.

9. The capacitive touch-sensing device of claim 1, further comprising a plurality of thin film transistors, each thin film transistor being associated with a corresponding one of the capacitive touch sensor electrodes, at least one of the thin film transistors comprising a heterojunction field-effect transistor.

10. A capacitive touch-sensing device, comprising:
   a plurality of capacitive touch-sensors having first and second plates and including a subset of the capacitive touch sensors positioned to form a two-dimensional array having rows of capacitive touch sensors in a first direction and columns of capacitive touch sensors in a second direction;
   a pulse generator configured to generate time duration pulses in the range of 1 to 100 microseconds, the pulses being systematically applied to one row of capacitive touch sensors after another applying one pulse per row of capacitive touch sensors;

a plurality of thin film transistors, each thin film transistor associated with a capacitive touch sensor and having a first channel end connected to the first plate of the capacitive touch sensor, the second plate of the capacitive touch sensor being grounded;

a plurality of column sensing lines, a second channel end of each thin film transistor being connected to a corresponding one of the column sensing lines;

a plurality of row activating lines, a gate of each thin film transistor being connected to a corresponding one of the row activating lines to transition corresponding ones of the thin film transistors to a conducting state during a time when a pulse is impressed on the corresponding one of the row activating lines and to transition the corresponding ones of the thin film transistors to a nonconducting state when no pulse is impressed on the corresponding one of the row-activating lines;

a plurality of thin film inductors each having first leads, the thin film inductors being connected to corresponding ones of the column sensing lines by corresponding ones of the first leads of the thin film inductors; and an excitation circuit configured to apply an excitation signal to the column sensing lines, wherein each of the thin film inductors has a second lead coupled to the excitation circuit such that the excitation signal is applied to the second leads of the thin film inductors and thence to the column sensing lines; and wherein the excitation circuit is configured to apply the excitation signal to the column sensing lines at a single frequency.

11. The capacitive touch-sensing device of claim 10, further comprising a substrate, the substrate having the plurality of thin film transistors and the thin film inductors fabricated thereon.

12. The capacitive touch-sensing device of claim 11 wherein the substrate is transparent.

13. The capacitive touch-sensing device of claim 11 wherein the substrate is selected from the group consisting of glass, silicon and plastic.

14. A capacitive touch-sensing device, comprising:

a plurality of touch-sensors including a subset of the touch sensors positioned to form a two-dimensional array having rows of touch sensors in a first direction and columns of touch sensors in a second direction;

a pulse generator configured to generate time duration pulses in the range of 1 to 100 microseconds, the pulses being systematically applied to one row of touch sensors after another applying one pulse per row of touch sensors;

a plurality of thin film transistors, each thin film transistor associated with a touch sensor and having a first channel end connected to the touch sensor;

a plurality of column sensing lines, a second channel end of each thin film transistor being connected to a corresponding one of the column sensing lines;

a plurality of row activating lines, a gate of each thin film transistor being connected to a corresponding one of the row activating lines to transition corresponding ones of the thin film transistors to a conducting state during a time when a pulse is impressed on the corresponding one of the row activating lines and to transition the corresponding ones of the thin film transistors to a nonconducting state when no pulse is impressed on the corresponding one of the row-activating lines;

a plurality of thin film inductors each having first leads, the thin film inductors being connected to corresponding ones of the column sensing lines by corresponding ones of the first leads of the thin film inductors; and an excitation circuit configured to apply an excitation signal to the column sensing line, wherein at least one of the thin film transistors is fabricated as a heterojunction field-effect transistor.

* * * * *